May 16, 1961    I. C. MINOR ET AL    2,984,101
TAPE METHOD FOR DETECTING FATIGUE CRACKS
Filed Sept. 4, 1957

INVENTORS
Irene C. Minor
John A. Bennett
BY
ATTORNEYS

2,984,101
TAPE METHOD FOR DETECTING FATIGUE CRACKS

Irene C. Minor and John A. Bennett, Bethesda, Md., assignors to the United States of America as represented by the Secretary of Commerce Filed Sept. 4, 1957, Ser. No. 682,071

5 Claims. (Cl. 73—104)

The present invention relates to material testing procedures and particularly contemplates an improved method for detecting small fatigue cracks in material subject to repeated stress.

Fatigue failures in metallic materials start as minute cracks that continue to grow under the influence of the applied fluctuating stress until the remaining metal is no longer sufficient to support a load and complete fracture occurs. One unfortunate characteristic of fatigue failures is the fact that when the cracks occurring consequent to fatigue are visible to the eye, a dangerous condition of failure exists before remedial steps can be taken to minimize the consequent dangers. Since the growth of cracks due to fatigue may be relatively slow, if the cracks can be detected when they are extremely small it would be possible to avoid catastrophic failure. However, since a small fatigue crack is extremely difficult to detect visually, there being no visible distortion of metal about the crack, the crack tends to close up when the metal is not stressed and incipient fatigue failures are apt to escape detection. The present invention provides means for detecting fatigue cracks of extremely small magnitude and thereby provides a testing and inspecting procedure for anticipating fatigue failures at a time well in advance of material failure.

It is accordingly an immediate object of the present invention to provide an improved method for detecting fatigue failures in metallic materials undergoing stress in advance of the occurrence of material failure.

A further object of this invention is to provide an improved method of determining incipient fatigue failures in metallic materials undergoing stress.

An additional object of this invention is to provide an inspecting procedure for qualitatively determining the suitability of metallic material for use under conditions of repeated stress.

Other uses and advantages of the invention will become apparent upon reference to the specification and drawings, in which.

In accordance with the principles of the present invention a sheet or film of transparent pressure-sensitive adhesive material is applied to the surface of a metallic specimen to be tested. A fluctuating stress is applied to the specimen in a conventional manner and the surface covered by the film is observed preferably with the aid of illuminating light striking the surface at a grazing incidence. The appearance of areas or boundaries of small bubbles underneath the surface of the film has been observed in all instances in which subsequent fatigue cracks have appeared. In accordance with the method of the present invention the number of cycles of stress applied to the material under test required to cause bubble formation is much less than that required to produce visual cracking or fissuring of the material. The presence of the areas of bubbles which are easily seen by the unaided eye makes it possible to locate the fatigue cracks in minute form much more easily than by observing the surface of the material.

Figure 1:
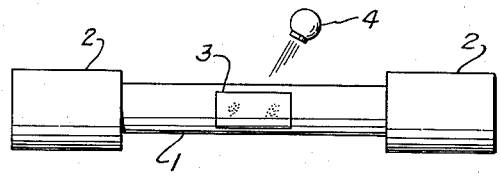
Fig. 1 is a schematic representation of a typical apparatus which may be employed for implementing the test procedures of the present invention.

Fig. 1 shows a specimen 1 of metallic material held in the chucks 2 of a conventional testing machine. The machine may be the type which repetitiously applies torsional or bending stresses to the specimen. The pressure-sensitive adhesive film 3 is applied to a suitable portion of the surface of the material under test as indicated in Fig. 1, and a light source 4 is provided to illuminate the area covered by the film.

Figure 2:
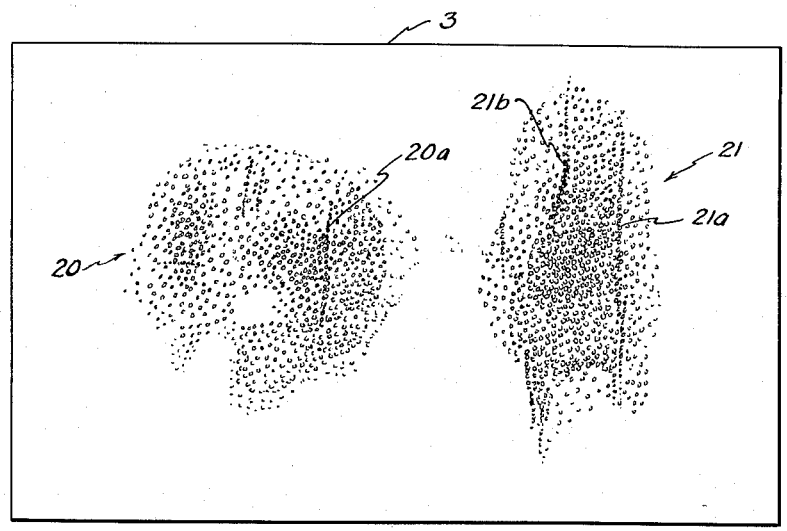
Fig. 2 is an enlarged view of a metal specimen undergoing torsional fatigue test and showing the formation of bubbles in accordance with the procedures of the present invention.
Figure 3:
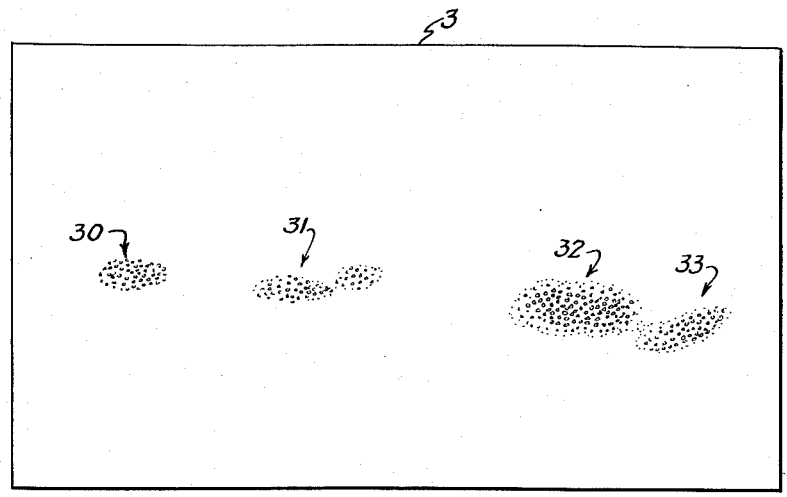
Fig. 3 is a view similar to Fig. 2 showing a metal specimen being subjected to a bending fatigue test.

Figs. 2 and 3 are enlarged photographs of exemplary results obtained in accordance with the practice of the present invention.

Fig. 2 shows the bubble pattern obtained consequent to torsion fatigue tests on a metal specimen which has been stressed torsionally for 2,000 cycles. Fig. 2 is a photographic representation seen through the area covered by the film 3. Bubble formation is clearly apparent as designated by the areas or patches 20 and 21. When such areas are closely examined with the aid of a microscope, small fatigue fissures or cracks in the areas designated 20a, 21a, 21b are clearly apparent.

Fig. 3 shows the bubble patterns obtained when a specimen has been subject to a bending test of 1,000 repeated cycles. The bubble patterns 30, 31, 32, and 33 are clearly apparent in the drawings, the patterns serving to delineate the areas where fatigue cracks subsequently appear.

The present method also has utility for the qualitative inspection of metallic parts that may be subject to fatigue failure. To inspect such metal elements, the method contemplates covering the part to be inspected with the transparent pressure-sensitive film above described, applying a number of cycles of repeated stress somewhat below that expected in the actual service of the part and inspecting the covered area with light striking the surface a grazing incidence. The appearance of any bubbling indicates that the material would be unsatisfactory for any further repeated stresses.

The transparent pressure-sensitive film employed is of a commercially available variety such as is marketed under the trade name of "Scotch tape." It is to be understood, however, that any pressure-sensitive tape which is transparent and has the ability to adhere to the surface of a metallic specimen is satisfactory for the present invention.

The above-described testing and inspecting procedure is particularly efficacious in connecting with metallic specimens. Bubble formation is most readily discernible in aluminium and aluminium alloys. Steel and steel alloys exhibit similar results, the bubble formation being slightly less striking. Other nonferrous metals and metal alloys do not demonstrate bubble formation to as marked a degree.

What is claimed is:

1. A method for detecting fatigue cracks in a metallic specimen comprising the steps of applying an transparent pressure-sensitive adhesive film to the specimen, applying a fluctuating stress to the specimen until bubble formation is manifested in the area covered by the film and observing the area covered by the film for bubble formation.

2. A method for detecting the appearance of surface flaws consequent to fatigue in a metallic specimen comprising the steps of applying a transparent pressure-sensitive adhesive film to the specimen, and applying a fluctuating stress to the specimen until bubble formation is manifested in the area covered by the film and observing the area covered by the film for bubble formation.

3. A method for detecting fatigue cracks in a metallic specimen comprising the steps of applying a transparent pressure-sensitive adhesive film to the specimen, applying a fluctuating stress to the specimen until bubble formation is manifested in the area covered by the film and inspecting the area for bubble formation with light striking the surface at grazing incidence.

4. A method for inspecting metal parts for qualitatively determining their suitability for use under conditions of repeated stress comprising the steps of applying a transparent pressure-sensitive adhesive film to the specimen, applying a fluctuating stress to the specimen for a number of cycles substantially less than that required to normally induce fatigue failure in the specimen and observing the area covered by the film for bubble formation.

5. The invention of claim 1 in which said film comprises a transparent flexible backing material.

References Cited in the file of this patent
UNITED STATES PATENTS

| | | |
|---|---|---|
| 2,186,014 | Ellis | Jan. 9, 1940 |
| 2,667,070 | Sockman et al. | Jan. 26, 1954 |